(12) United States Patent
Oyama et al.

(10) Patent No.: US 12,497,754 B2
(45) Date of Patent: Dec. 16, 2025

(54) WORKING VEHICLE

(71) Applicant: TAKEUCHI MFG. CO., LTD., Nagano (JP)

(72) Inventors: Hidaka Oyama, Nagano (JP); Shota Maruyama, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 285 days.

(21) Appl. No.: 18/223,119

(22) Filed: Jul. 18, 2023

(65) Prior Publication Data
US 2024/0287756 A1    Aug. 29, 2024

(30) Foreign Application Priority Data

Feb. 27, 2023    (JP) ................................ 2023-027879

(51) Int. Cl.
*E02F 9/08*         (2006.01)
*B60L 53/80*        (2019.01)

(52) U.S. Cl.
CPC ............ *E02F 9/0858* (2013.01); *B60L 53/80* (2019.02); *B60L 2200/40* (2013.01)

(58) Field of Classification Search
CPC .... E02F 9/0858; B60L 53/80; B60L 2200/40; B60L 50/60; B60K 2001/0477
See application file for complete search history.

(56) References Cited

U.S. PATENT DOCUMENTS

2013/0078071 A1\*   3/2013   Noguchi ................ B60K 1/04
                                                      414/719
2021/0345550 A1    11/2021   Uemura et al.

FOREIGN PATENT DOCUMENTS

| EP | 4 309 937 A1 | 1/2024 |
| JP | 61-35032 U | 3/1986 |
| JP | 7025226 B2 | 2/2022 |

OTHER PUBLICATIONS

Extended European Search Report dated Jul. 30, 2024, issued in counterpart Application No. 23186363.0. (8 pages).
Office Action issued on Jun. 17, 2025, in counterpart Japanese patent No. 2023-027879 with English translation (8 pages).

\* cited by examiner

*Primary Examiner* — Huan Le
(74) *Attorney, Agent, or Firm* — WHDA, LLP (57) ABSTRACT

There is provided a working vehicle facilitating the attachment/detachment of a battery pack. A working vehicle has a vehicle body, a travel unit, a working unit working by a hydraulic pressure, and an electric motor serving as a drive source for the travel unit or the working unit; the vehicle body includes a main body frame provided in a lower portion and serving as a reinforcing member and a support member for on-board devices; the main body frame includes a large plate serving as a bottom plate; the large plate has a cutout area provided in a rear portion, facing backward in a plane view, and allowing the support section of a device loading/unloading a battery pack to abut on the cutout area, and the battery pack is disposed above the cutout area.

4 Claims, 6 Drawing Sheets

WORKING VEHICLE

CROSS-REFERENCE TO RELATED APPLICATION

This application is based upon and claims the benefit of priority of the prior Japanese Patent Application No. P2023-027879, filed on Feb. 27, 2023, and the entire contents of which are incorporated herein by reference.

TECHNICAL FIELD

The present invention relates to a working vehicle including a working unit working by a hydraulic pressure, an electric motor that is a drive source for the working unit and a battery pack that supplies electric power to the electric motor.

BACKGROUND ART

As an example of a working vehicle, a hydraulic excavator, a track loader, and the like including a lower body to which driving crawlers or tires are mounted, an upper body provided on the lower body, and a working unit that is mounted to the lower body or the upper body and that works by a hydraulic pressure are known.

Recently, a working vehicle driven by an electric motor instead of a conventional engine is under development (refer to PTL: Japanese Patent No. 7025226).

SUMMARY OF INVENTION

Technical Problem

In the working vehicle driven by the electric motor described above as an example, a battery pack is mounted on-board in a rear portion of the upper body. Such a battery pack has been required to use crane equipment, a special hoisting attachment, and the like in the attachment/detachment of the battery pack. Furthermore, a work place for attachment/detachment has been limited.

Solution to Problem

The present invention has been accomplished under the circumstances. An object of the present invention is to provide a working vehicle capable of facilitating the attachment/detachment of a battery pack.

The present invention solves the problems by the following solutions.

A working vehicle has a vehicle body, a travel unit, a working unit working by a hydraulic pressure, and an electric motor serving as a drive source for the travel unit or the working unit; the vehicle body includes a main body frame provided in a lower portion and serving as a reinforcing member and a support member for on-board devices; the main body frame includes a large plate serving as a bottom plate; the large plate has a cutout area provided in a rear portion, facing backward in a plane view, and allowing the support section of a device loading/unloading a battery pack to abut on the cutout area, and the battery pack is disposed above the cutout area.

With the configurations, a support section (claw in a forklift) of a cargo-carrying machine such as the forklift can be advanced from a rear portion of the vehicle body to load/unload the battery pack, eliminating the need to use crane equipment, a dedicated hoisting attachment, and the like during the attachment/detachment of the battery pack. That is, it is possible to provide a working vehicle capable of facilitating the attachment/detachment of the battery pack.

Furthermore, it is preferable that the cutout area is formed such that at least a location in front of a center of gravity in the battery pack is exposed.

It is also preferable that a partition plate is provided above the battery pack, and a protective plate is provided on a surface of the partition plate which is opposed to the battery pack to cover a fixing member that fixes an electrical component provided on the other surface of the partition plate.

Advantageous Effects of Invention

According to the present invention, it is possible to provide a working vehicle capable of facilitating the attachment/detachment of a battery pack.

DESCRIPTION OF EMBODIMENTS

Figure 1:
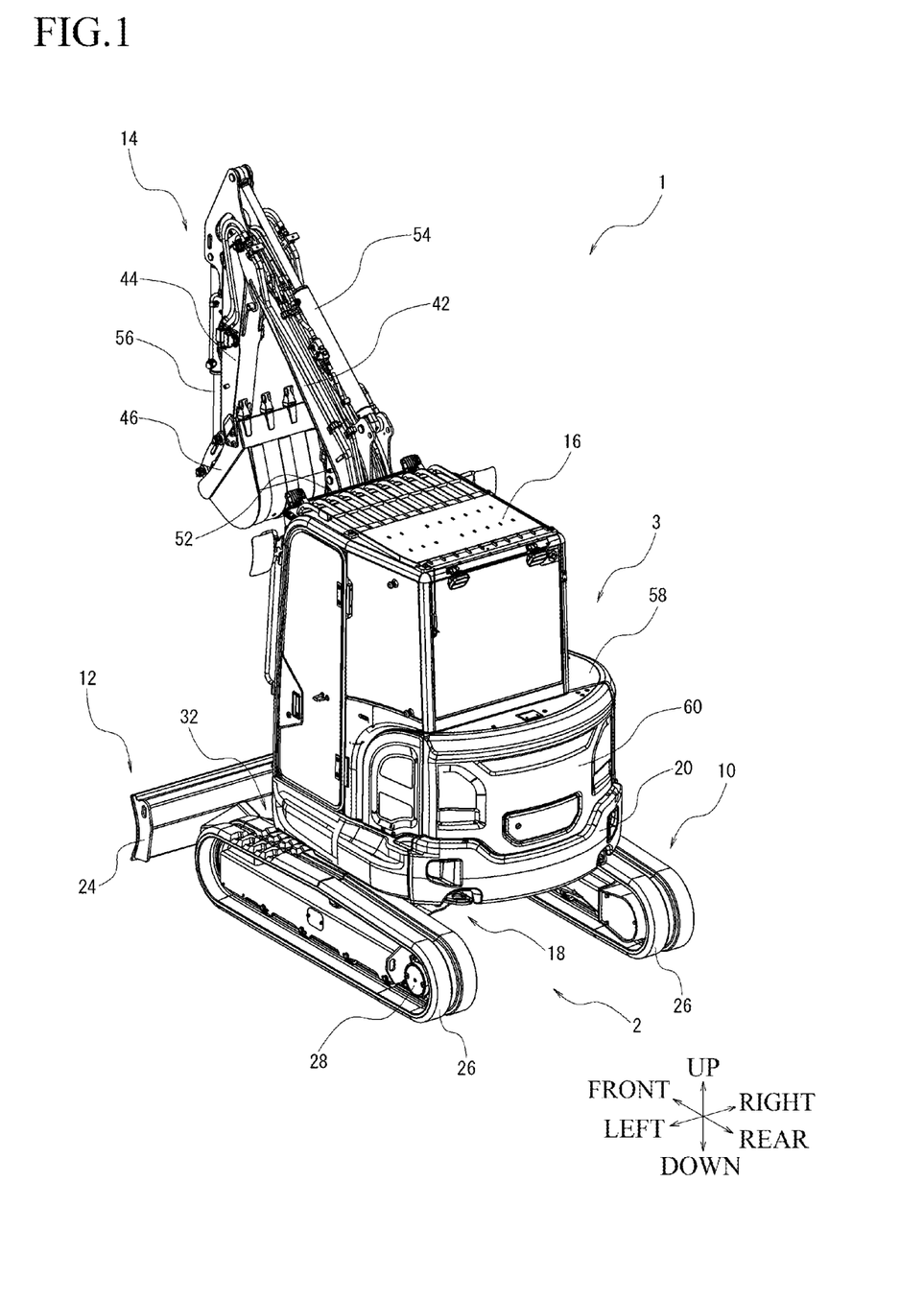
FIG. 1 is a perspective view illustrating an example of a working vehicle according to an embodiment of the present invention.

An embodiment of the present invention will be described hereinafter in detail with reference to the drawings. FIG. 1 is a schematic view illustrating an example of a working vehicle 1 according to the present embodiment (perspective view from above a left rear portion). For the sake of convenience of description, arrows may indicate up and down, front and back, and left and right directions in the drawings. In addition, members having the same function are denoted by the same reference sign and may not be repeatedly described in all the drawings for describing the embodiments.

Overall configurations of the working vehicle 1 will first be described. A hydraulic excavator will be described as an example of the working vehicle 1. However, the working vehicle 1 is not limited to the hydraulic excavator.

As illustrated in FIG. 1, the working vehicle 1 includes a lower body 2 and an upper body 3 provided on the lower body 2 as a vehicle body (the lower body 2 and the upper body 3 may be configured as one piece).

The working vehicle 1 includes working units 12 and 14 mounted to the lower body 2 or the upper body 3 and worked by a hydraulic pressure (hydraulic oil at a predetermined pressure). The lower body 2 includes a travel unit 10 that travels. The upper body 3 includes a cab 16 provided in a front portion and in which operating units for an operator to operate traveling and working are provided. Detailed configurations of the upper body 3 will be described later.

The lower body 2 includes a pair of left and right crawlers (tracks) 26 as an example of the travel unit 10. However, the travel unit 10 is not limited to the crawlers 26. As another example, the working vehicle 1 may include tires (not illustrated) instead of the crawlers 26. The crawlers 26 are each driven (to travel) by a hydraulic travel motors 28.

The working vehicle 1 includes a blade 24 as an example of the working unit 12. The blade 24 is mounted to the lower body 2 in such a way as to be able to swing upward and downward (including forward and backward components). The blade 24 is driven by a hydraulic cylinder (blade cylinder) 32. However, the working unit 12 is not limited to the above configurations.

The working vehicle 1 includes a boom 42, an arm 44, and an attachment (a bucket in the present embodiment) 46 as an example of the working unit 14. However, the attachment 46 is not limited to the bucket. The boom 42 is mounted to the upper body 3 in such a way as to be able to swing upward and downward (including forward and backward components). In the present embodiment, a boom bracket (not illustrated) is provided between the upper body 3 and the boom 42. The boom bracket enables the boom 42 to swing to left and right (including forward and backward components) in reaction to the upper body 3. It is noted that the boom bracket may be omitted. The arm 44 is mounted to the boom 42 in such a way as to be able to swing upward and downward (including forward and backward components). The attachment 46 is mounted to the arm 44 in such a way as to be able to swing upward and downward (including forward and backward components). The boom 42 is driven by a hydraulic cylinder (boom cylinder) 52. The arm 44 is driven by a hydraulic cylinder (arm cylinder) 54. The attachment 46 is driven by a hydraulic cylinder (bucket cylinder) 56. However, the working unit 14 is not limited to the above configurations.

A driving mechanism for driving the hydraulic travel motors 28 and the hydraulic cylinders is configured from a hydraulic pump driven by a drive source, a control valve, and the like (all of which are not illustrated). The control valve is actuated by an operator operating the operating units to exercise control to supply hydraulic oil at a predetermined pressure delivered from the hydraulic pump to the hydraulic travel motors 28 and the hydraulic cylinders. This allows for the travel unit 10 to travel and for the working units 12 and 14 to work. One or a plurality of hydraulic pumps configuring the driving mechanism are provided depending on configurations, loads, and the like of the working units 12 and 14 and the travel unit 10.

In the present embodiment, the working vehicle 1 includes an electric motor (not illustrated) as the drive source. One or a plurality of electric motors configuring the drive source are provided depending on the number, rated output power, and the like of the hydraulic pumps.

The working vehicle 1 also includes an on-board charger 62 that supplies electric power to the electric motor. The electric power output from the on-board charger 62 is supplied to the electric motor via a battery pack 64 and an inverter (not illustrated). The battery pack 64 includes a first rechargeable battery (e.g., lithium-ion rechargeable battery) that stores the supplied electric power, a control section controlling the supply of the electric power to the electric motor and the rechargeable battery (first rechargeable battery), and the like (all of which are not illustrated). A second rechargeable battery (e.g., lead-acid rechargeable battery) and switches (controllers) are connected to the battery pack 64 (all of which are not illustrated).

Other mechanisms for traveling and working in the working vehicle 1 according to the present embodiment are similar to those in a well-known working vehicle (hydraulic excavator) and not described in detail.

Figure 2:
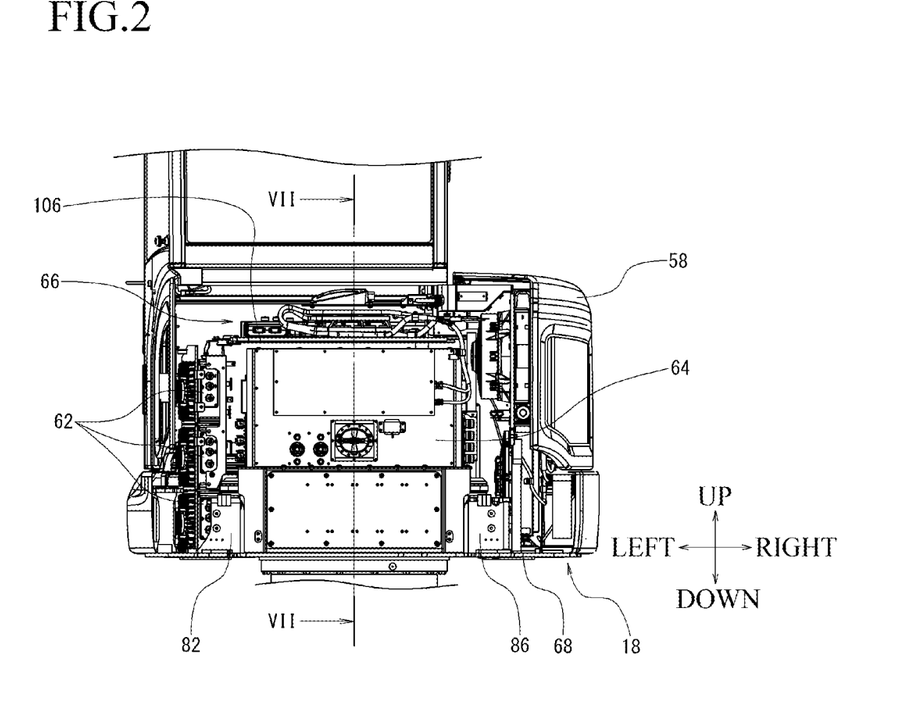
FIG. 2 is a back view illustrating a state of mounting a battery pack mounted on-board in the working vehicle illustrated in FIG. 1.
Figure 3:
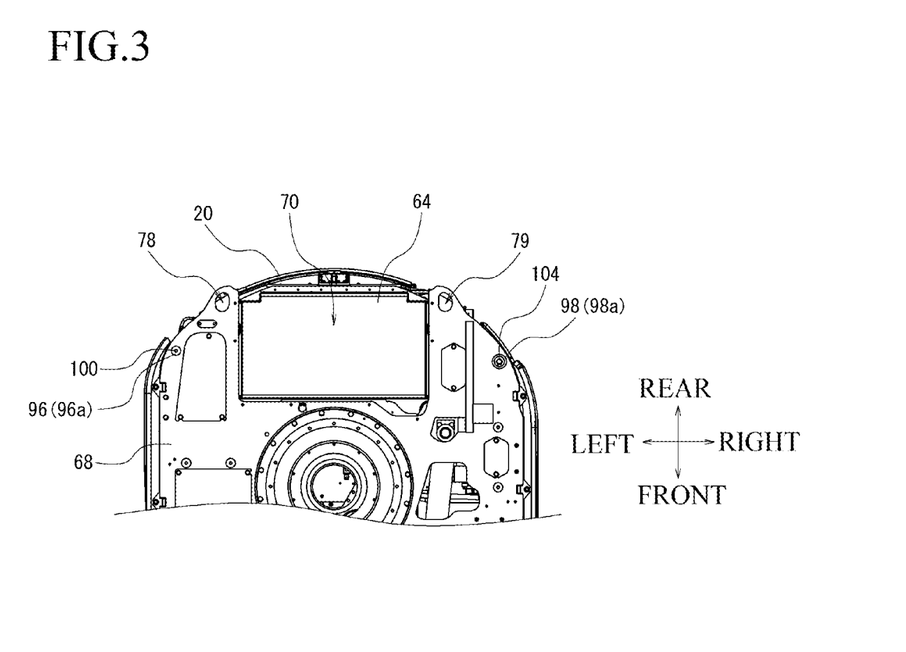
FIG. 3 is a bottom view illustrating the state of mounting the battery pack mounted on-board in the working vehicle illustrated in FIG. 1.
Figure 9:
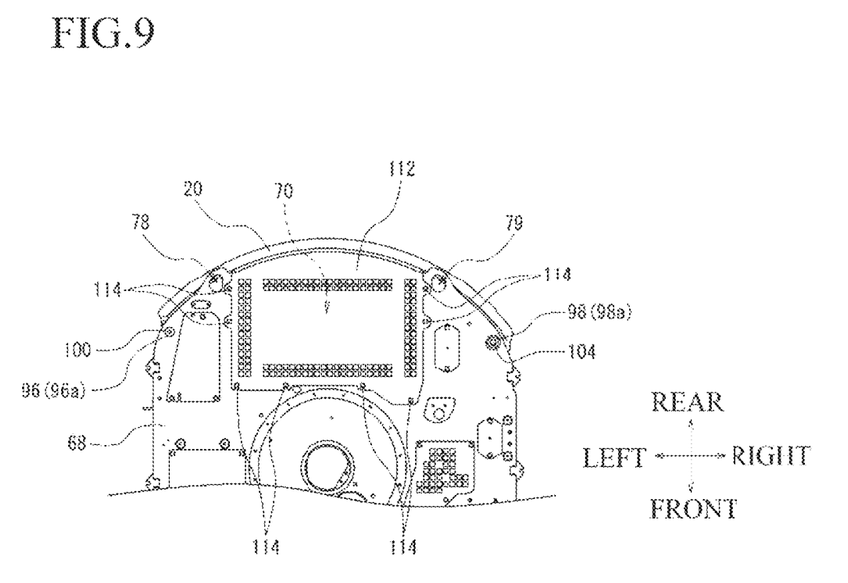
FIG. 9 is a bottom view of an upper body of the working vehicle illustrated in FIG. 1.

Configurations of the upper body 3 will next be described in detail. FIG. 2 is a back view illustrating a state of mounting the battery pack 64 on-board in the working vehicle 1 (with a battery cover 60 and a counterweight 20 not illustrated). FIG. 3 is a bottom view illustrating the state of mounting the battery pack 64 on-board in the working vehicle 1 (with an under cover 112 not illustrated). FIG. 9 is a bottom view of the upper body 3. The upper body 3 includes a main body frame 18 in a lower portion. The main body frame 18 serves as both a reinforcing member for the upper body 3 and a support member for on-board devices. The upper body 3 includes the battery pack 64 mounted to the main body frame 18 and supplying electric power to the electric motor. The upper body 3 includes the counterweight 20 mounted to the main body frame 18 and maintaining a weight balance of a vehicle body.

Figure 4:
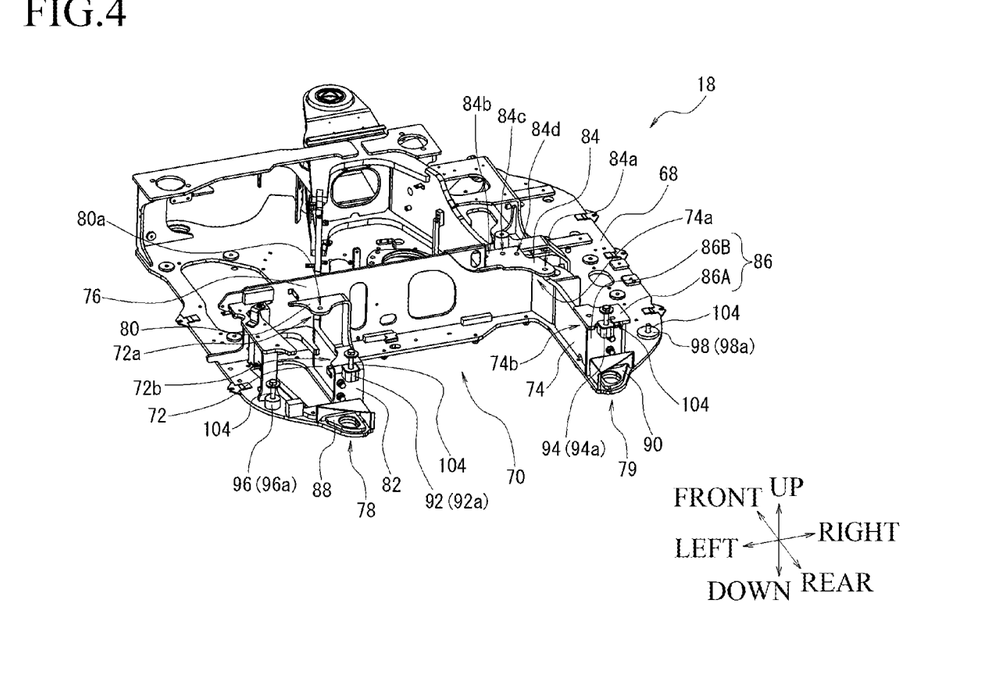
FIG. 4 is a perspective view of a main body frame of the working vehicle illustrated in FIG. 1.
Figure 5:
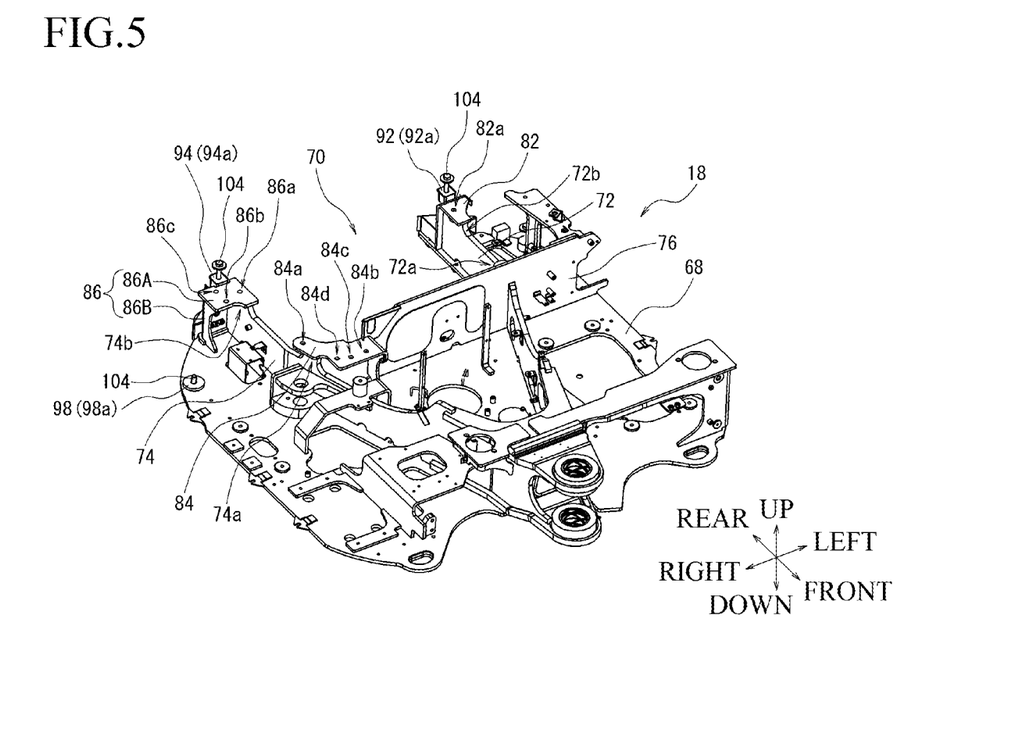
FIG. 5 is a perspective view of the main body frame illustrated in FIG. 4 from a different direction.

As illustrated in FIGS. 4 and 5, the main body frame 18 is formed from plates, beams, and the like worked into predetermined shapes and welded integrally. Specifically, the main body frame 18 includes a large plate 68, longitudinal ribs 72, 74, and a cross rib 76.

The large plate 68 is a plate that serves as a bottom plate of the main body frame 18. The large plate 68 has a cutout area 70 in a rear portion. The cutout area 70 faces backward direction in a plane view. The large plate 68 includes the under cover 112 that shields the cutout area 70 and that prevents the penetration of a cloud of sand into the upper body 3. The under cover 112 is mounted to a lower surface of the large plate 68 by fixing members 114. The large plate 68 includes lashing points (mechanisms for locking binding members (not illustrated) used to prevent accidental movement such as rolling and falling during transport or parking of the working vehicle 1) 78, 79 in left and right rear end portions apart from each other across the cutout area 70. Lashing point reinforcing members 88, 90 are fixedly attached onto the lashing points 78, 79, respectively. The longitudinal ribs 72, 74 are built upright as a pair of left and right ribs so that the longitudinal ribs 72, 74 extend backward on the large plate 68 in a forward and backward direction from a front portion of the large plate 68 as a starting point along left and right edges of the cutout area 70 to be spaced apart in a left and right direction. The cross rib 76 intersects the longitudinal ribs 72, 74 and is built upright to extend on the large plate 68 in the left and right direction along a front edge of the cutout area 70.

A mounting structure of the battery pack 64 and the counterweight 20 will next be described.

The longitudinal rib 72 includes a first mounting seat 80 for mounting the battery pack 64 and a second mounting seat 82 for mounting the battery pack 64 and the counterweight 20. The longitudinal rib 74 includes a third mounting seat 84 for mounting the battery pack 64, a floor frame (not illustrated), and a hydraulic oil tank (not illustrated) and a fourth mounting seat 86 for mounting the battery pack 64, the floor frame, and the counterweight 20.

As an example, the first mounting seat 80 is a generally L-shaped plate in a front view, which extends right from a protruding portion 72a of the longitudinal rib 72 and then bends and extends generally at a right angle from an end portion of the extension in a downward direction (toward the large plate 68), with a front portion of the first mounting seat 80 abutting on a rear surface of the cross rib 76. The first mounting seat 80 has one mounting hole (screw hole) 80a on an upper surface. However, configurations of the first mounting seat 80 are not limited to these configurations.

As an example, the second mounting seat 82 is a generally L-shaped plate in a side view, which extends backward from a protruding portion 72b of the longitudinal rib 72 and then bends and extends generally at a right angle from an end portion of the extension along a rear end of the longitudinal rib 72. The second mounting seat 82 is mounted to the large plate 68 by intersecting a front portion of the lashing point reinforcement member 88. The second mounting seat 82 has one mounting hole (screw hole) 82a on an upper surface. The second mounting seat 82 also includes a first counterweight mounting section 92 for mounting the counterweight 20. The first counterweight mounting section 92 has one mounting hole (screw hole) 92a. However, configurations of the second mounting seat 82 are not limited to these configurations.

As an example, the third mounting seat 84 is a generally L-shaped plate in a front view, which extends ahead of a protruding portion 74a of the longitudinal rib 74 on the left to stride over the cross rib 76 and then bends and extends generally at a right angle from an end portion of the extension downward (toward the large plate 68). The third mounting seat 84 has one mounting hole (screw hole) 84a for mounting the battery pack 64 and three mounting holes (screw holes) 84b, 84c, 84d for mounting the floor frame and the hydraulic oil tank on an upper surface. However, configurations of the third mounting seat 84 are not limited to these configurations.

As an example, the fourth mounting seat 86 includes an upper plate 86A mounted to a protruding portion 74b of the longitudinal rib 74 and a generally L-shaped lower plate 86B in a plane view that supports the upper plate 86A from below. The fourth mounting seat 86 is mounted to the large plate 68 by intersecting a front portion of the lashing point reinforcement member 90. The fourth mounting seat 86 has one mounting hole (screw hole) 86a for mounting the battery pack 64 and two mounting holes (screw holes) 86b, 86c for mounting the floor frame on an upper surface. The fourth mounting seat 86 also includes a second counterweight mounting section 94 for mounting the counterweight 20. The second counterweight mounting section 94 has one mounting hole (screw hole) 94a. However, configurations of the fourth mounting seat 84 are not limited to these configurations.

Figure 6:
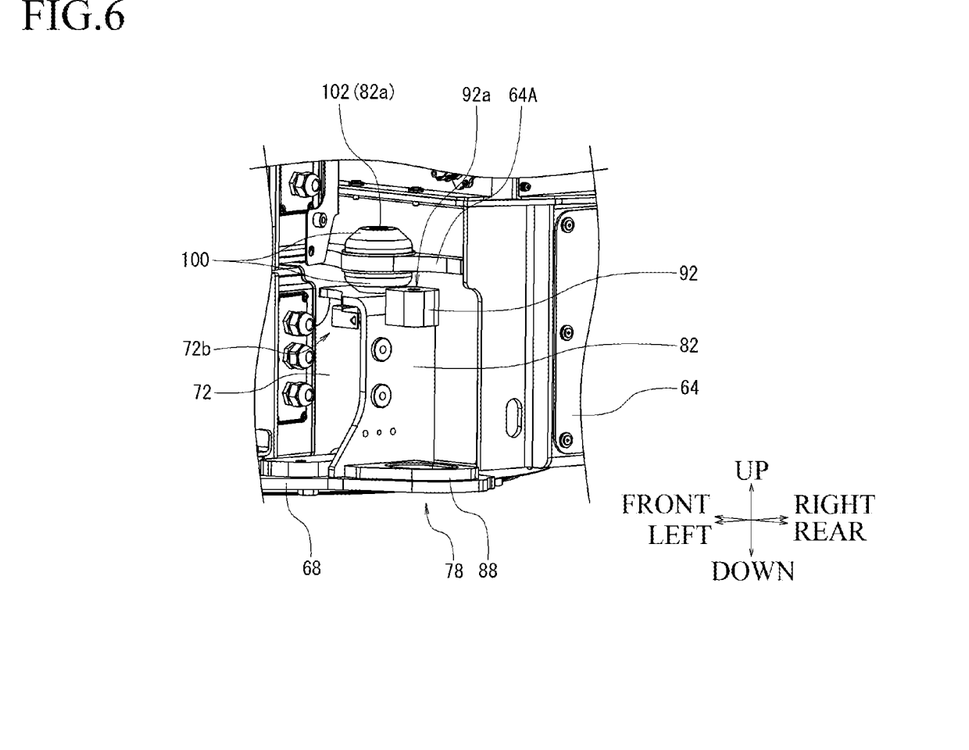
FIG. 6 is a perspective view illustrating a state of mounting the battery pack to the main body frame.

The battery pack 64 includes a bracket 64A protruding from left and right side surfaces. The bracket 64A is fixed to the mounting seats 80 (mounting hole 80a), 82 (mounting hole 82a), 84 (mounting hole 84a), 86 (mounting hole 86a) by rubber vibration insulators 100 and a fixing member 102. This enables the battery pack 64 to be mounted to the longitudinal ribs 72, 74 (main body frame 18). FIG. 6 illustrates a state where the battery pack 64 is fixed to the second mounting seat 82. Since being firmly fixed to the longitudinal ribs 72, 74 by welding, the mounting seats 80, 82, 84, 86 can support the battery pack 64 that is large-sized and heavy.

The battery pack 64 mounted to the main body frame 18 is located upward of the cutout area 70. With this structure, a support section (claw in a forklift) of a cargo-carrying machine such as the forklift can be advanced from a rear portion of the vehicle body to load/unload the battery pack 64, eliminating the need to use crane equipment, a dedicated hoisting attachment, and the like. That is, this can facilitate the attachment/detachment of the battery pack 64. Furthermore, the battery pack 64 is supported by the longitudinal ribs 72, 74 while floating from the large plate 68, allowing the rubber vibration insulators 100 to absorb vibration during traveling and working to suppress the vibration propagating to the battery pack 64.

Moreover, as illustrated in FIG. 3, the cutout area 70 is formed such that at least a location in front of the center of gravity in the battery pack 64 is exposed in the bottom view. This enables the forklift to lift the battery pack 64.

The counterweight 20 is fixed to the counterweight mounting sections 92 (mounting hole 92a), 94 (mounting hole 94a) described above by fixing members (e.g., bolts) 104 to allow the counterweight 20 to be mounted to the longitudinal ribs 72, 74 (main body frame 18). The counterweight 20 is also fixed to a third counterweight mounting section 96 (mounting hole 96a) and a fourth counterweight mounting section 98 (mounting hole 98a) provided on the large plate 68 by the fixing members 104 to allow the counterweight 20 to be mounted to the large plate 68 (main body frame 18).

It is noted that the counterweight 20 is fixed to the three counterweight mounting sections 92, 94, 96 by penetrating the fixing members 104 into the counterweight mounting sections 92, 94, and 96 from above. The counterweight 20 is fixed to one counterweight mounting section 98 by penetrating the fixing member 104 into the counterweight mounting section 98 from below. In the conventional working vehicle, a plurality of locations (e.g., two locations) of the counterweight are fixed from above and a plurality of other locations (e.g., two locations) thereof are fixed from below. According to the present embodiment, by contrast, only one location is fixed from below, eliminating time and labor for accessing the lower mounting section.

Figure 7:
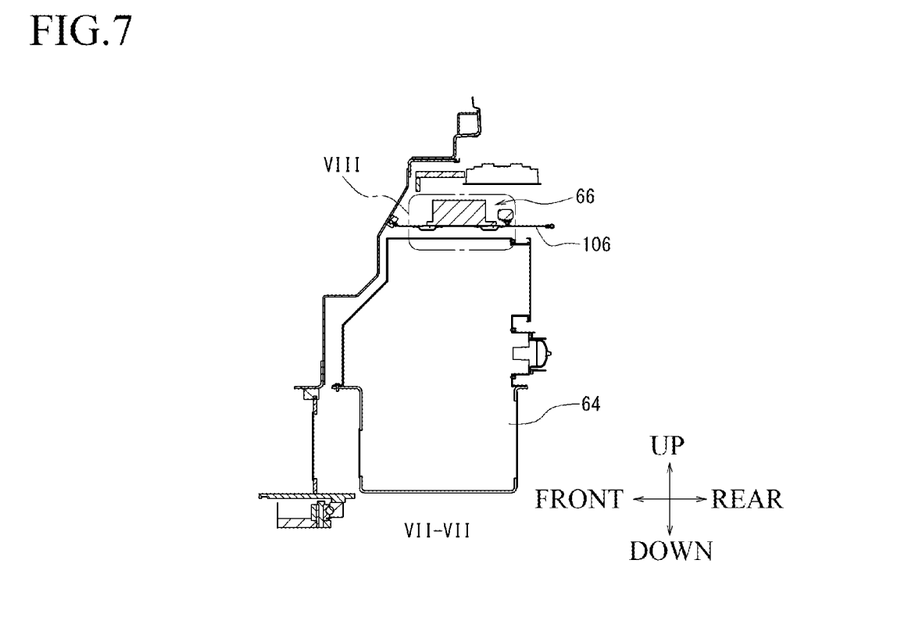
FIG. 7 is a cross-sectional view of a VII-VII cross-section illustrated in FIG. 2.
Figure 8:
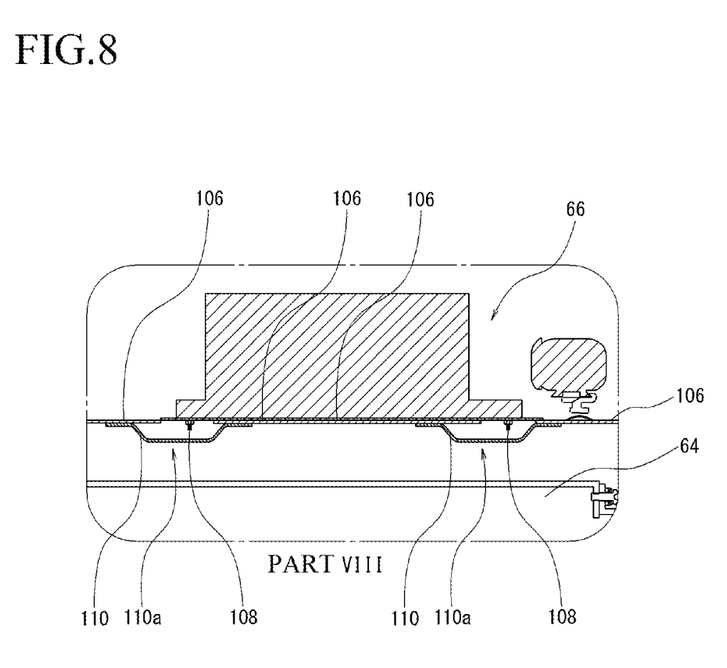
FIG. 8 is an enlarged view of part VIII illustrated in FIG. 7.

Meanwhile, as illustrated in FIGS. 7 and 8, the working vehicle 1 includes a partition plate 106 above the battery pack 64. An electrical component (such as a DC-DC converter in the present embodiment) 66 is disposed on an upper surface of the partition plate 106. The electrical component 66 is fixed to the partition plate 106 by a plurality of fixing members (e.g., bolts and nuts) 108, with the fixing members 108 protruding through a lower surface (i.e., surface opposed to the battery pack 64) of the partition plate 106. Two protective plates 110 covering these protruding fixing members 108 are disposed on the lower surface of the partition plate 106 to be apart forward and backward. For example, each protective plate 110 is a plate extending in the left and right direction and has a protruding portion 110a protruding downward in a side view. A cross-sectional shape of the protruding portion 110a is a trapezoid having an upper bottom longer than a lower bottom and widening upward. The protective plates 110 are disposed on the lower surface of the partition plate 106 in a way to accommodate the fixing members 108 in the protruding portions 110a. With this structure, when the forklift excessively lifts the battery pack 64 during loading/unloading of the battery pack 64, an upper surface of the battery pack 64 abuts on the protective plates 110 (lower bottoms of the protruding portions 110a). Therefore, this can eliminate the risk of causing the battery pack 64 to touch the fixing members 108 to damage the battery pack 64. However, configurations and disposing positions of the protective plates 110 are not limited to those described above. It is noted that the protective plates 110 also serve as reinforcing members for the partition plate 106.

Operation for removing the battery pack 64 from the working vehicle 1 will now be described. First, the battery cover 60, which is hinged to a right side cover 58 to be swingable left and right (including forward and backward components) with respect to the right side cover 58, is opened. Next, the plurality of fixing members 104 fixing the counterweight 20 to the main body frame 18 (counterweight mounting sections 92, 94, 96, 98) are detached to remove the counterweight 20. In addition, a plurality of fixing members 114 fixing the under cover 112 to the main body frame 18 (large plate 68) are detached to remove the under cover 112. It is noted that the order of removing the counterweight 20 and the under cover 112 may be set freely. Next, an electronic connector attached to the battery pack 64 is removed. The plurality of rubber vibration insulators 100 and the plurality of fixing members 102 fixing the battery pack 64 to the main body frame 18 (mounting seats 80, 82, 84, 86) are then removed. Next, the claw of the forklift is advanced between the upper body 3 and the lower body 2 from the rear portion of the vehicle body and located below the cutout area 70. The claw is raised in that state to abut on a lower surface of the battery pack 64 and then further raised, allowing the battery pack 64 to be lifted by the forklift. When the forklift moves backward from the vehicle body in that state, allowing for the removal of the battery pack 64 from the working vehicle 1. It is noted that mounting the battery pack 64 to the working vehicle 1 may be performed in the opposite order to those for these operation procedures.

In this way, in the working vehicle 1 according to the present embodiment, the battery pack 64 can be attached and detached simply by removing (mounting) the fixing members fixing the counterweight 20, the under cover 112, and the battery pack 64 to the main body frame 18 and unloading (loading) the battery pack 64 using the forklift.

As described so far, according to the present invention, it is possible to provide a working vehicle capable of facilitating the attachment/detachment of a battery pack.

While the working vehicle capable of attaching/detaching (loading/unloading) the battery pack 64 using the forklift has been described as an example of the working vehicle 1, the battery pack can be attached/detached using crane equipment and a dedicated hoisting attachment as in the conventional technique.

The present invention is not limited to the above example (hydraulic excavator). The present invention is similarly applicable to other working vehicles (e.g., a track loader and a tracked dumper).

What is claimed is:

1. A working vehicle having a vehicle body, a travel unit, a working unit working by a hydraulic pressure, and an electric motor serving as a drive source for the travel unit or the working unit,
   wherein the vehicle body comprises a main body frame provided in a lower portion and serving as a reinforcing member and a supporting member for on-board devices,
   wherein the main body frame comprises a large plate serving as a bottom plate,
   wherein the large plate has a cutout area provided in a rear portion, facing backward in a plane view, and allowing a support section of a device loading/unloading a battery pack to abut on the cutout area,
   wherein an under cover that shields the cutout area is provided on the large plate, and
   wherein the battery pack is disposed above the cutout area.

2. The working vehicle according to claim 1,
   wherein the cutout area is formed such that at least a location in front of a center of gravity in the battery pack is exposed.

3. The working vehicle according to claim 2,
   wherein a partition plate is provided above the battery pack, and
   wherein a protective plate is provided on a surface of the partition plate which is opposed to the battery pack to cover a fixing member that fixes an electrical component provided on the other surface of the partition plate.

4. The working vehicle according to claim 1,
   wherein a partition plate is provided above the battery pack, and
   wherein a protective plate is provided on a surface of the partition plate which is opposed to the battery pack to cover a fixing member that fixes an electrical component provided on the other surface of the partition plate.

* * * * *